US005853027A

United States Patent [19]

Winkel et al.

[11] Patent Number: 5,853,027

[45] Date of Patent: Dec. 29, 1998

[54] APPARATUS AND METHOD FOR OPERATING PAINT COLOR VALVES IN A PAINT SPRAYING SYSTEM

[75] Inventors: Robert J. Winkel, Royal Oak; Mark J. Benard, Clawson, both of Mich.

[73] Assignee: Fanuc Robotics North America, Inc., Auburn Hills, Mich.

[21] Appl. No.: 803,256

[22] Filed: Feb. 20, 1997

[51] Int. Cl.[6] .......... G05B 11/01

[52] U.S. Cl. .......... 137/624.18; 251/30.01; 118/696

[58] Field of Search .......... 251/30.01, 129.04; 137/624.18, 624.2; 118/695, 696, 698; 239/69

[56] References Cited

U.S. PATENT DOCUMENTS

| | | | |
|---|---|---|---|
| 4,957,060 | 9/1990 | Cann | 118/699 |
| 4,992,952 | 2/1991 | Sasaki . | |
| 5,146,950 | 9/1992 | Rodgers et al. . | |
| 5,318,065 | 6/1994 | Edwards et al. . | |
| 5,351,715 | 10/1994 | Byam . | |
| 5,444,611 | 8/1995 | Woytowitz | 137/624.2 |

*Primary Examiner*—John Fox
*Attorney, Agent, or Firm*—Howard & Howard

[57] ABSTRACT

An apparatus (10) and method for selecting a fluid material to be supplied to a material applicator (24) from a plurality of fluid materials (23), the material applicator being located in a hazardous area (12), includes a control circuit (26) located in a non-hazardous area (11) for generating a coded address signal representing a selected fluid material and for generating a predetermined amount of electrical power, a valve selection circuit (27) located in the non-hazardous area and connected to the control circuit and being responsive to the coded address signal for generating the predetermined amount of electrical power at a selected one of a plurality of outputs corresponding to the coded address signal, and a valve actuation circuit (28) located in the hazardous area and including a separate valve (22) connected to each of the valve selection circuit outputs. The valves (22) includes electrically actuated valves (46) mounted on and pneumatically actuated valves (47) releasably retained in a manifold assembly (41) formed of a plurality of blocks (42,43,44) each having a material distribution passage (62) connected to the material applicator (24) and a material inlet passage (60) connected to the fluid material supply (23). The control circuit (26) limits the predetermined amount of electrical power to a value sufficient to actuate one of the electrically actuated valves (46) and permit fluid material flow from the material inlet passage (60) to the material distribution passage (62) through the associated one of the pneumatically actuated valves (47).

9 Claims, 8 Drawing Sheets

APPARATUS AND METHOD FOR OPERATING PAINT COLOR VALVES IN A PAINT SPRAYING SYSTEM

BACKGROUND OF THE INVENTION

The present invention relates generally to an apparatus for controlling the flow of coating materials and, in particular, to an apparatus and method for selectively operating paint color valves in a spray painting system.

The U.S. Pat. No. 5,318,065 shows a coating material dispensing system having a controller which generates control signals which are binary encoded in a non-hazardous area and are transmitted in parallel form. The control signals are passed through optical isolators to the intrinsically safe decoding circuits and applied to intrinsically safe material type controls in the hazardous area. The coating material type controls include intrinsically safe solenoid actuated valves for applying compressed air to pneumatically actuated color valves. Power for the solenoid actuated valves and the demultiplexer circuits is provided by a power supply through a current barrier.

The U.S. Pat. No. 5,351,715 shows a coating material color change system having a plurality of pneumatically actuated color valves mounted on a manifold for dispensing a selected coating material onto a vehicle. Intrinsically safe solenoid actuated valves supply compressed air to each color valve. Each solenoid actuated valve is attached to an associated one of the color valves. The manifold and the color valves are shown in more detail in the U.S. Pat. No. 5,146,950. The manifold has a plurality of segments joined together by threaded fittings. Each segment mounts two color valves which extend from opposite sides thereof.

The U.S. Pat. No. 4,992,952 shows a paint discharge rate control system that incorporates a paint flow regulator in a paint supply line connecting a color changing valve group to a painting nozzle, a paint mass flow meter for measuring the mass flow rate of the paint and a control for controlling the paint flow regulator in response to the paint mass flow rate. The control also controls the mass flow regulator during a push-out operation in which the color changing valves are closed and a washing valve is opened to clean the paint supply line.

SUMMARY OF THE INVENTION

The present invention concerns an apparatus for selecting a fluid material to be supplied to a material applicator from a plurality of fluid materials, the material applicator being located in a hazardous area. The apparatus includes: a control circuit means adapted to be located in a non-hazardous area for generating a coded address signal representing a selected fluid material and for generating a predetermined amount of electrical power; a valve selection circuit means connected to the control circuit means and having at least two outputs each corresponding to a different fluid material, the valve selection circuit adapted to be located in the non-hazardous area and being responsive to the coded address signal for generating the predetermined amount of electrical power at a selected one of the outputs corresponding to the coded address signal; and a valve actuation circuit means including a separate valve means connected to each of the valve selection circuit outputs, the valve actuation circuit means adapted to be located in a hazardous area and each of the valve means having a material distribution passage for connection to a common material applicator and a material inlet passage for connection to a separate supply of fluid material whereby the control circuit means limits the predetermined amount of electrical power to a value sufficient to actuate one of the valve means and the valve means connected to the selected one output responds to the predetermined amount of electrical power by permitting flow of fluid material from the material inlet passage to the material distribution passage. The apparatus also includes: a manifold assembly with a plurality of blocks each having at least one valve cavity formed therein, a material distribution passage formed in the block in fluid communication with the valve cavity, a material inlet passage and a material outlet passage formed in each block in fluid communication with the valve cavity, an air distribution passage formed in the block and a connecting passage formed in the block in fluid communication with the valve cavity; a separate electrically actuated valve mounted on each block and connected between the air distribution passage and the connecting passage; and a separate pneumatically actuated valve associated with each of the electrically actuated valves and retained in an associated one of the valve cavities, whereby when a source of pressured air is connected to the air distribution passage and the pneumatically actuated valves each are connected between a material applicator and a supply of fluid material, actuation of a selected one of the electrically actuated valves applies the pressured air to the associated pneumatically actuated valve which is actuated to connect the supply of fluid material to the material applicator.

The present invention also concerns a method of selecting a fluid material to be supplied to a material applicator from a plurality fluid materials in a hazardous area comprising the steps of: locating a plurality of pneumatically actuated valves in a hazardous area and connecting each of the pneumatically actuated valves between an associated source of fluid material and a common material applicator; locating a plurality of electrically actuated valves in the hazardous area and connecting each of the electrically actuated valves between a common source of pressured air and an associated one of the pneumatically actuated valves; locating a plurality of switches in a non-hazardous area and connecting each of the switches between a common power supply and an associated one of the electrically actuated valves; actuating one of the switches corresponding with a selected one of the fluid materials; and limiting electrical power from the power supply to a predetermined amount sufficient to actuate the electrically actuated valve connected to the one switch whereby the associated pneumatically actuated valve is actuated to permit flow of the selected fluid material to the material applicator.

It is an object of the present invention to reduce the time required to begin supplying a selected paint color to a spray painting apparatus.

It is another object of the present invention to reduce the number of parts required and the cost of a paint color selection system.

It is a further object of the present invention to provide an intrinsically safe paint color selection system a portion of which can be mounted in a purged motor cavity of a robot.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
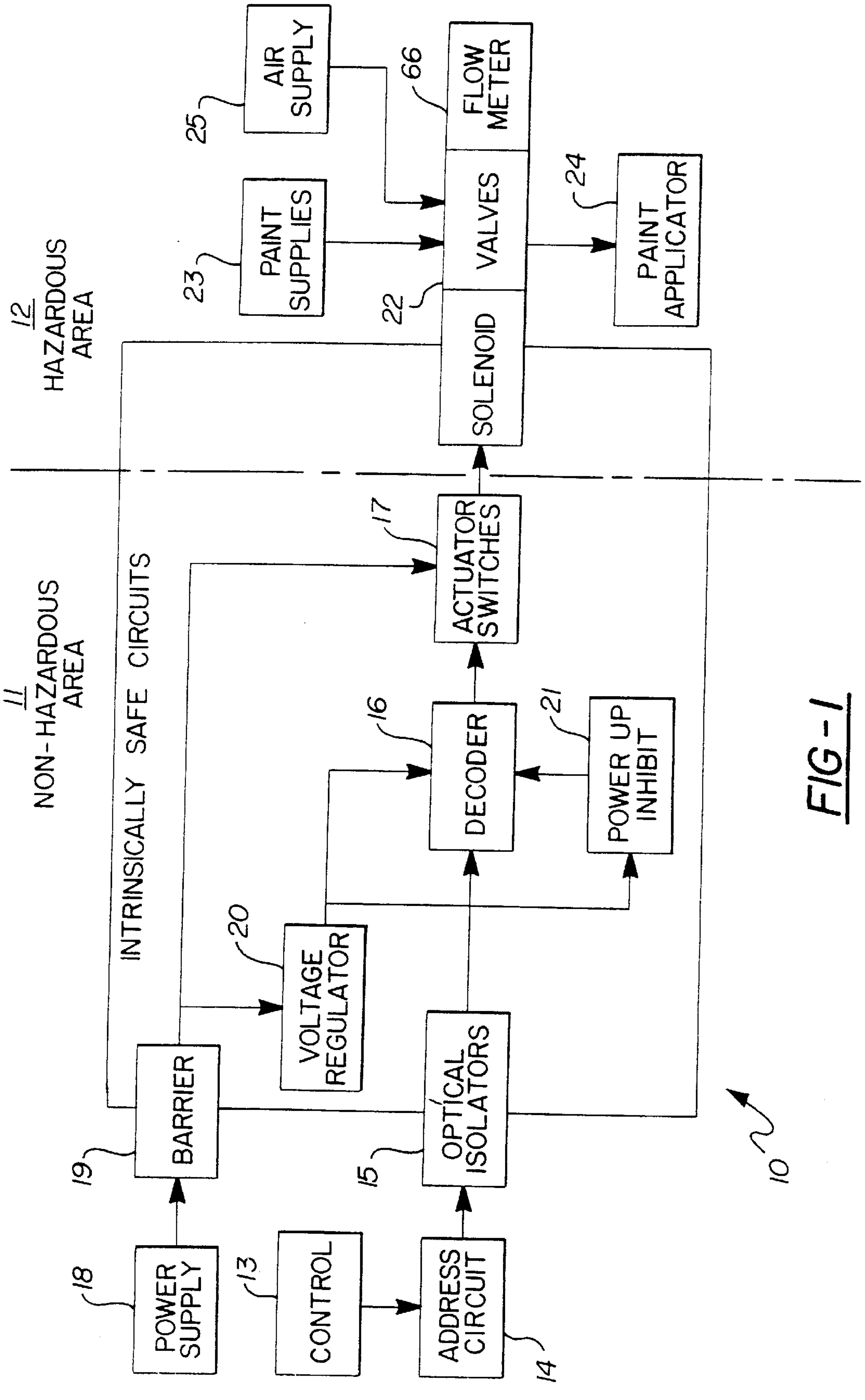
FIG. 1 is a schematic block diagram of a paint spraying system including an apparatus for operating paint spraying color valves in accordance with the present invention.

There is shown in the FIG. 1 a robotic paint spraying system 10 having a first portion located in a non-hazardous area 11 and a second portion located in a hazardous area 12. In the non-hazardous area 11 there is located electrical circuitry which selects which one of a plurality of paint color valves to actuate and provides only enough electrical power to operate the selected valve. In the hazardous area 12 there are located the valves to be selected and associated paint spraying equipment. The electrical circuitry in the non-hazardous area 11 includes a control 13 having an output connected to an input of an address circuit 14. The control 13 can be any suitable device, such as a programmable logic controller or a computer, which permits an operator to select any one of a plurality of valves to actuate and to determine the time and duration of actuation. The control 13 generates control signals representing the valve actuation information to the address circuit 14. The address circuit 14 has a plurality of outputs each connected through an associated one of a plurality of optical isolators 15 to an associated one of a plurality of inputs of a decoder 16. The address circuit 14 generates address signals to the decoder 16 which address signals represent the valve to be actuated and can be, for example, in the form of a five bit binary code which provides thirty-two binary addresses.

The decoder 16 has a plurality of outputs each connected to a switching input of an associated one of a plurality of actuator switches 17. Based upon the five bit binary code described above, up to thirty-two actuator switches 17 can be controlled, or thirty-one switches if one code (00000) is used for "all switches off". A power supply 18 has an output connected through an intrinsically safe barrier 19 to an input of a voltage regulator 20. The voltage regulator 20 has an output connected to an input of the decoder 16 and to an input of a power up inhibit circuit 21 to supply regulated voltage power thereto. The power up inhibit circuit 21 has an output connected to an input of the decoder 16 and functions to prevent the decoder from inadvertently turning on one of the actuator switches 17 when power is first applied to the system 10. The output of the power supply 18 also is connected through the barrier 19 to an input of each of the actuator switches 17 to provide the electrical power to actuate the paint color valves.

An output of each of the actuator switches 17 is connected to an input of an associated one of a plurality of combination valves 22 in the second portion of the system 10 which is located in the hazardous area 12. Each of the valves 22 is connected between an associated one of a plurality of paint supplies 23 and a paint applicator 24 typically positioned on the end of a robot arm. As described below, the combination valves 22 each include a solenoid actuated valve connected to an air supply 25 for operating an associated pneumatic valve. Thus, an operator can program the control 13 to actuate a selected one of the valves 22 and the system 10 will provide only enough electrical power to operate the one of the solenoids associated with the selected valve to permit the selected color paint to flow to the applicator 24.

Figure 2:
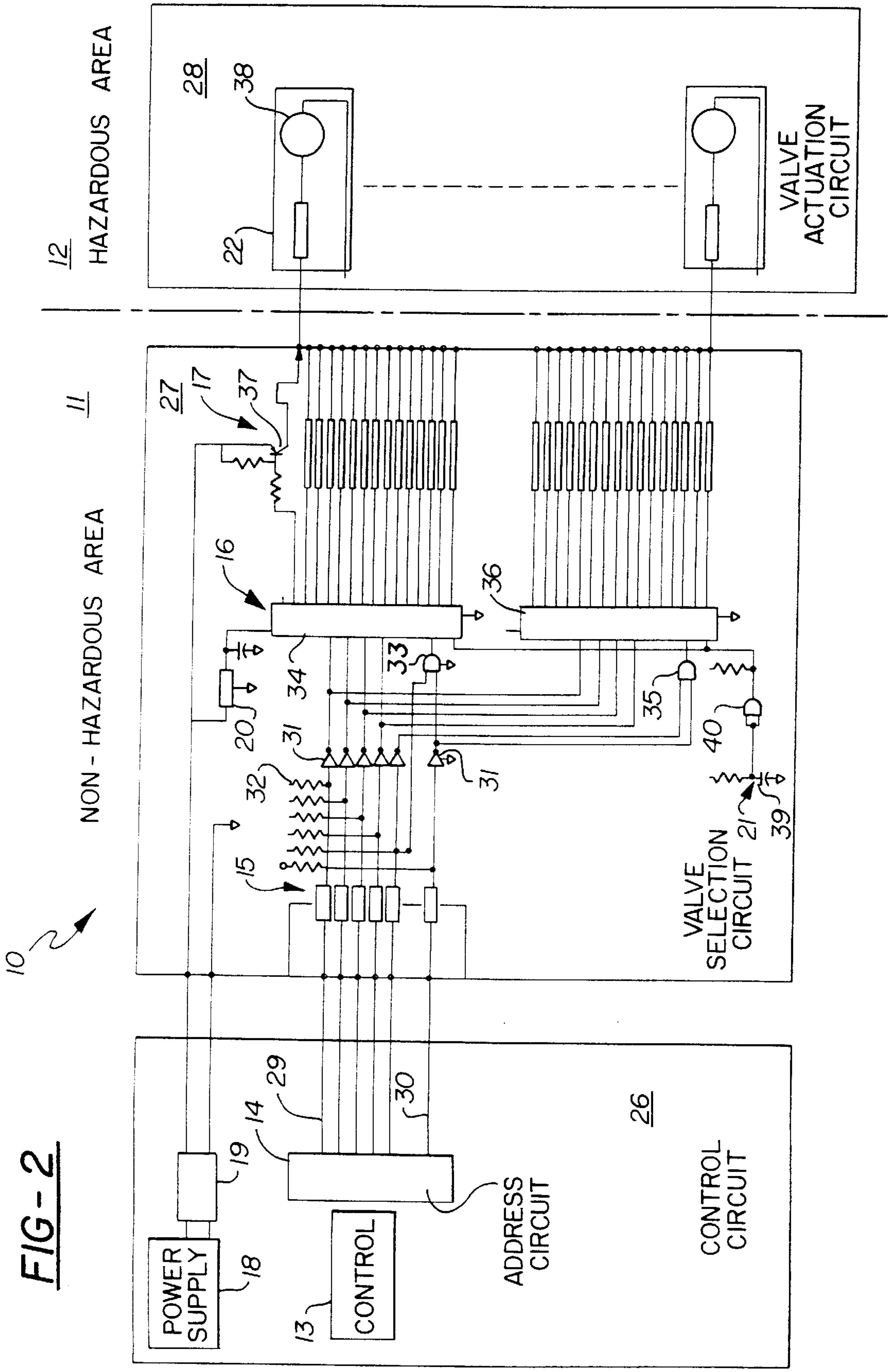
FIG. 2 is a detailed schematic diagram of the paint spraying system shown in the FIG. 1.

The FIG. 2 is a schematic diagram showing the paint spraying system 10 in more detail including a control circuit 26, a valve selection circuit 27 and a valve actuation circuit 28. In the control circuit 26, the power supply 18 can be a conventional twenty-four volt direct current power supply and the barrier 19 can reduce the power supply output voltage to approximately twenty volts. The control circuit 26 further includes the control 13 and the address circuit 14. The address circuit 14 has five address outputs each connected to an associated one of five address signal lines 29 and one strobe output connected to a strobe signal line 30. The lines 29 and 30 are connected to corresponding inputs of the decoder 16 through individual optical isolators 15 and individual signal inverters 31. Each of the lines 29 and 30 also is connected to the output of the voltage regulator 20 through an associated one of a plurality of resistors 32 connected between the associated optical isolator 15 and the associated signal inverter 31. The voltage regulator 20 provides approximately fifteen volts direct current power to maintain the address signal inputs to the decoder 16 at a logic "0" potential when no signal is being received from the address circuit 14. When the address circuit 14 generates a logic "1" signal on one of the lines 29, the corresponding optical isolator 15 generates a logic "0" signal which is changed to a logic "1" signal by the inverter 31. When the address signals at the outputs of the address circuit 14 have been stable for approximately 0.1 ms, the address circuit generates a logic "1" signal on the strobe signal line 30 which signal is changed to a logic "0" signal by the associated optical isolator 15 and is changed back to a logic "1" signal by the associated inverter 31. A first AND gate 33 has a pair of inputs and an output connected to a strobe input of a first four line to sixteen line decoder circuit 34 in the decoder 16. One of the inputs of the AND gate 33 is connected to the output of the inverter 31 and the other input is connected to the fifth one of the lines 29. Four address inputs of the decoder circuit 34 are connected to the first four of the address signal lines 29.

The output of the inverter 31 associated with the fifth address signal line 29 and the output of the inverter associated with the strobe signal line 30 are connected to a pair of inputs of a second AND gate 35. The second AND gate has an output connected to a strobe input of a second four line to sixteen line decoder circuit 36 in the decoder 16. Four address inputs of the decoder circuit 36 are connected to the first four address signal lines 29. Thus, the decoder circuits 34 and 36 provide up to thirty-two outputs each selectable by a corresponding five bit address generated on the address signal lines 29. The strobe signal generated to the strobe input of each of the decoder circuits 34 and 36 latches the address signals such that the decoder 16 generates only the selected output signal until it is reset.

The actuator switches 17 each can be a PNP transistor 37 having a base connected to the associated decoder circuit output, an emitter connected to the output of the barrier 19 and a collector connected to a coil 38 of the associated solenoid in one of the valves 22. The barrier 19 limits the amount of electrical current introduced into the hazardous area 12. For example, the barrier 19 generates only enough current to power one solenoid coil 38, approximately twenty-five milliamps, and enough current to power the valve selection circuit 27. The valve selection circuit 27 can be disposed within a purged motor cavity in a robot arm (not shown). The robot motor cavity is a purged non-hazardous area. The power up inhibit circuit 21 includes a capacitor 39 connected to the output of the voltage regulator 20 and to a pair of inputs of a third AND gate 40. The AND gate 40 has an output connected to inhibit inputs of the decoder circuits 34 and 36 to generate a logic "0" inhibit signal when power is first applied to delay for a predetermined time operation of the decoder 16 until the address signals on the address signal lines 29 have stabilized to prevent false actuation of a valve.

Figure 3:
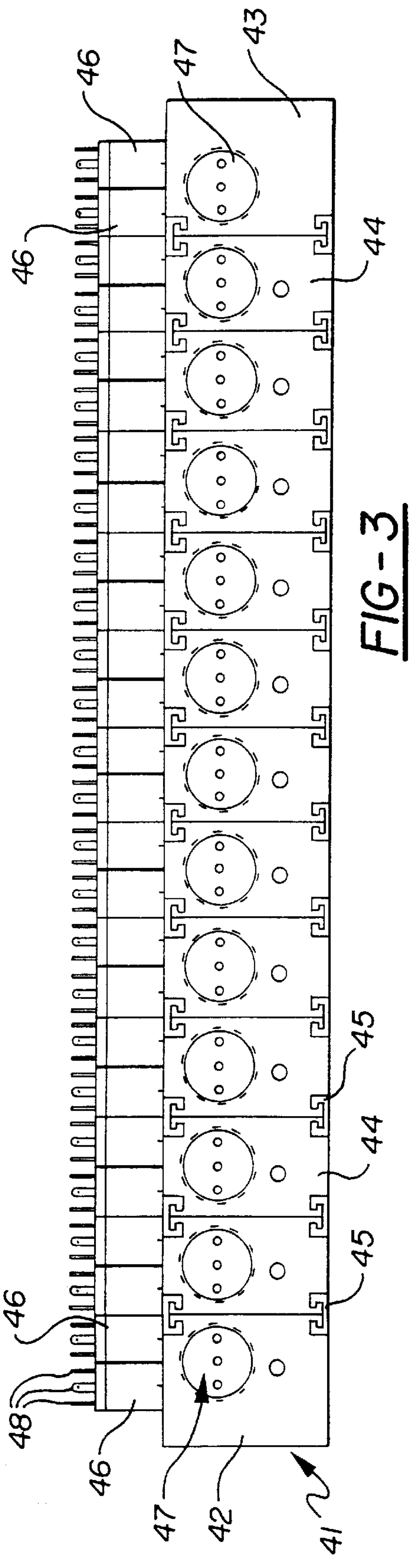
FIG. 3 is a front elevation view of a manifold assembly including the valves shown in the FIG. 1.
Figure 4:
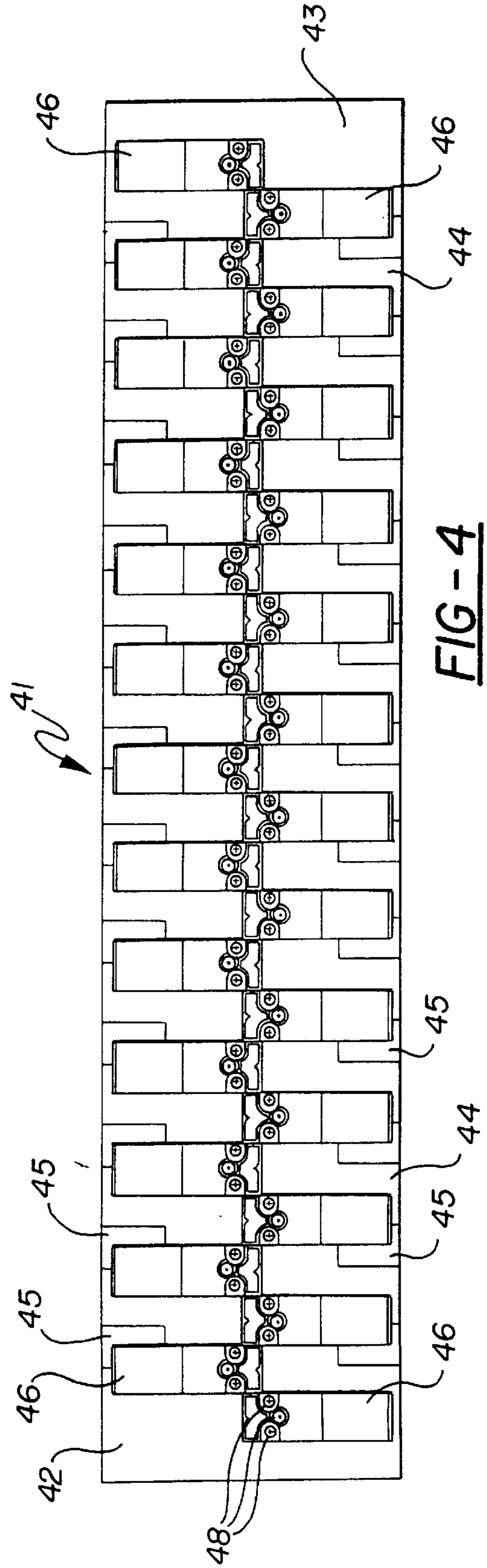
FIG. 4 is a top plan view of the manifold assembly shown in the FIG. 3.
Figure 5:
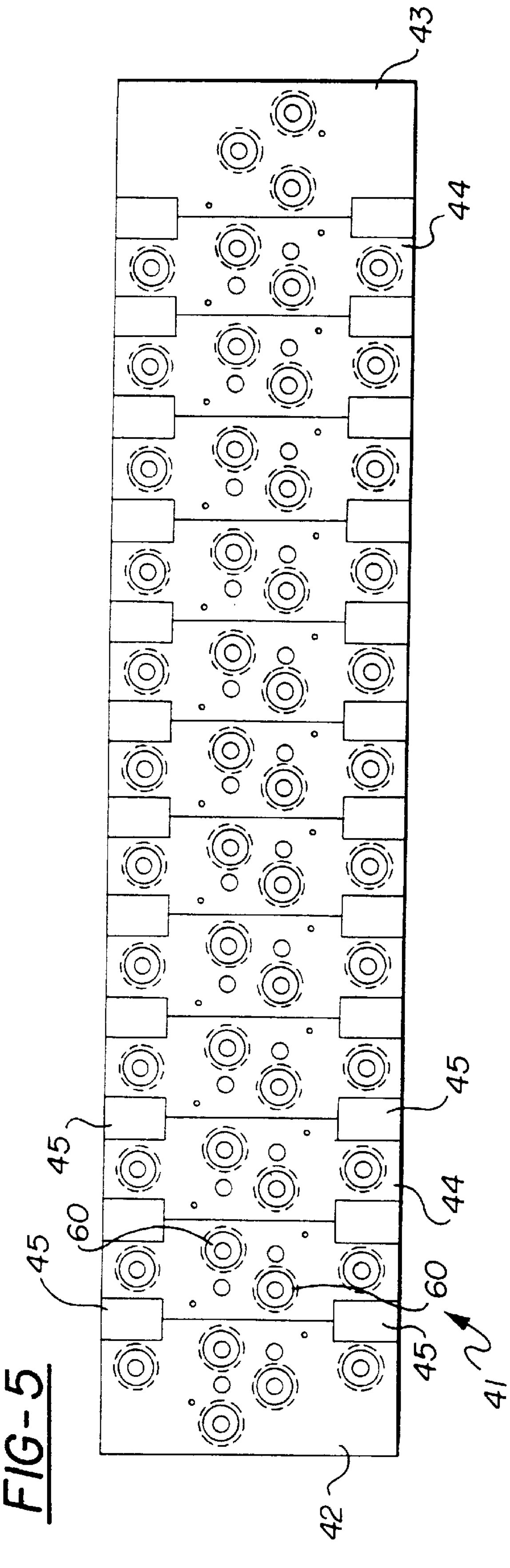
FIG. 5 is a bottom plan view of the manifold assembly shown in the FIG. 3.
Figure 10:
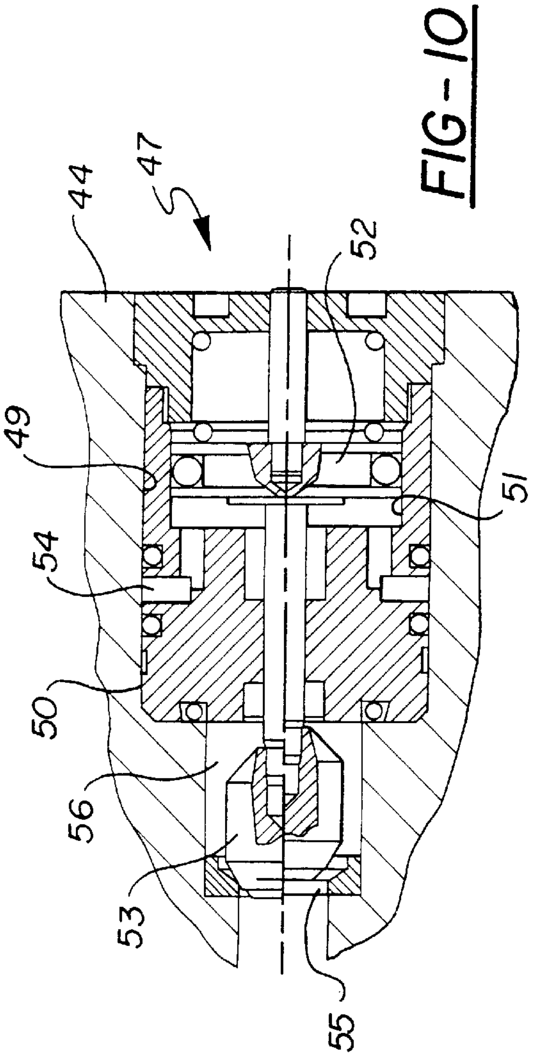
FIG. 10 is a cross-sectional view of one of the pneumatically actuated valves in the center block taken along the line 10—10 in the FIG.

With the above described circuitry, the valve actuation circuit 28 can be placed within the hazardous area 12 because the solenoids in the valves 22 are intrinsically safe since there is a minimal amount of electrical current present and only one solenoid coil 38 can be activated at a time. There is shown in the FIG. 3 through the FIG. 5 an elongated manifold assembly 41 which includes a flow meter end block 42 positioned at a left end thereof, a solvent/purge air end block 43 positioned at a right end thereof and a plurality of center blocks 44 positioned side-by-side between the end blocks. Each of the center blocks 44 is attached to the blocks on either side thereof by C-shaped clips 45 which engage at each upper and lower corner of the blocks front and rear. Mounted on an upper surface of each of the blocks is a pair of three way, two position, normally closed, solenoid actuated valves 46 each of which incorporates one of the solenoid coils 38 shown in the FIG. 2. The valves 46 are rated for a hazardous environment and are intrinsically safe. Each of the valves 46 is in fluid communication between the air supply 25 (FIG. 2) and one of two pneumatically actuated valves 47 located in the blocks 42, 43 and 44 as described below. The valves 47 can be commercially available Sames micro valves. Each of the valves 46 has three electrical terminals 48 extending from an upper surface thereof for connecting the internal solenoid coil 38 to the associated switch 37 in the valve selection circuit 27 shown in the FIG. 2.

The number of the center blocks 44 is dependent upon the number of paint colors desired. As described below, the flow meter end block 42 and each of the center blocks 44 can control two paint colors. The valves 46 and 47 are relatively small, and are easily removed from and replaced on the manifold assembly 41. In fact, the valves 47 can be removed and replaced without disturbing the valves 46 or detaching the blocks 42, 43 and 44 from the manifold assembly 41.

The center block 44 is shown in greater detail in the FIGS. 6 through 10. A pair of opposed valve cavities 49 are formed in the front and rear surfaces of the center block 44, each cavity for retaining one of the pneumatically actuated valves 47. As best shown in the FIG. 10, the valve 47 has a generally cylindrical valve body 50 in which a cylinder chamber 51 is formed. The body 50 can be externally threaded for retention by cooperating threads formed in the wall of the cavity 49. An air actuated, spring biased piston 52 is movable in the chamber 51 and is coupled to an oval poppet 53. An air passage 54, connected to the air supply 25 through the valve 46, extends from outside the valve body 50 into the chamber 51 on the poppet side of the piston 52. The poppet 53 is normally seated in an opening 55 at an inner end of the valve body 50. The opening 55 communicates between the exterior of the valve body 50 and an interior chamber 56 in which the poppet 53 is located. When the associated valve 46 is actuated, pressured air is supplied from the air supply 25 to the chamber 51 through the passage 54 to move the piston 52 toward the front surface of the valve body 50 and unseat the poppet 53.

Figure 8:
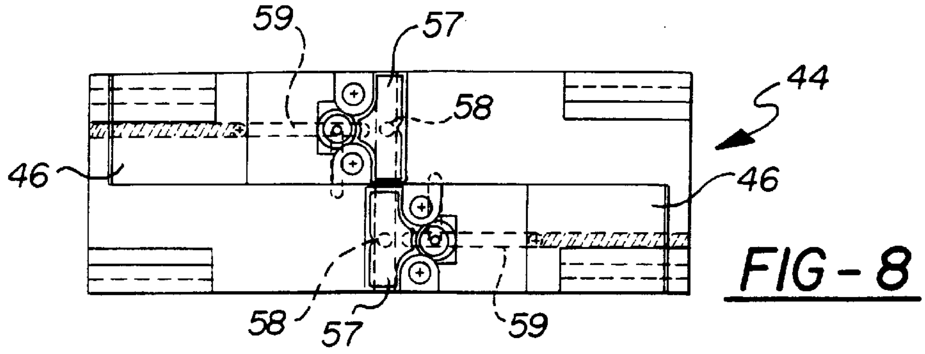
FIG. 8 is a top plan view of the center block shown in the FIG. 6.
Figure 6:
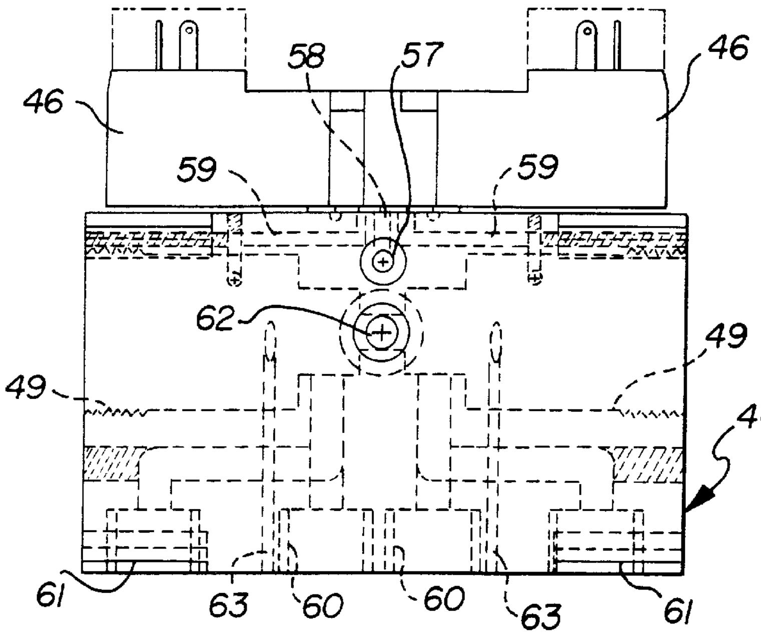
FIG. 6 is a side elevation view of one of the manifold assembly center blocks shown in the FIG. 3.
Figure 7:
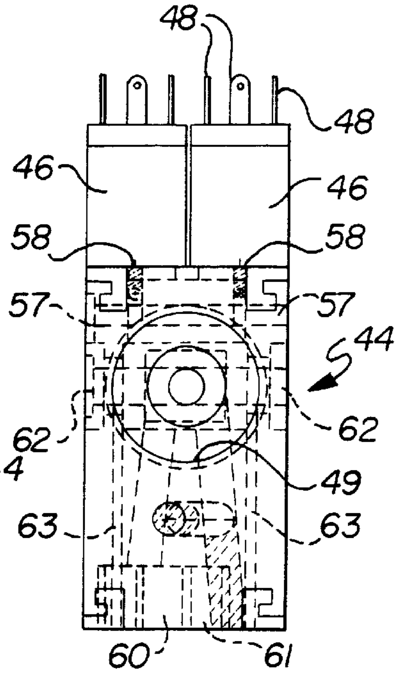
FIG. 7 is a front elevation view of the center block shown in the FIG. 6.

As shown in the FIGS. 6–8, an air distribution passage 57 extends from side to side through the center block 44 near the upper side thereof. The passage 57 has a pair of upwardly extending branches 58 each of which is in fluid communication with an associated one of the valves 46. A pair of connecting passages 59 are formed in the center block 44 each communicating between an associated one of the valves 46 and an associated one of the air passages 54 in the associated valve 47. The passage 57 is aligned with similar passages in the adjacent blocks so that the air supply 25 provides the pressured air to all of the valves 46 and 47.

Figure 9:
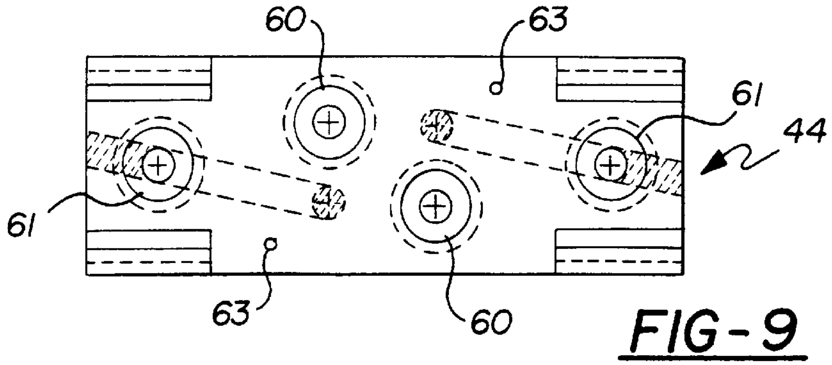
FIG. 9 is a bottom plan view of the center block shown in the FIG. 6.
Figure 13:
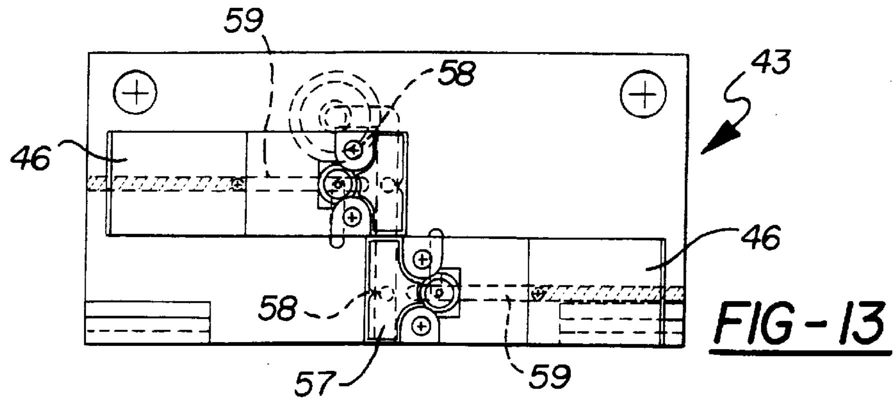
FIG. 13 is a top plan view of the end block shown in the FIG. 11.
Figure 11:
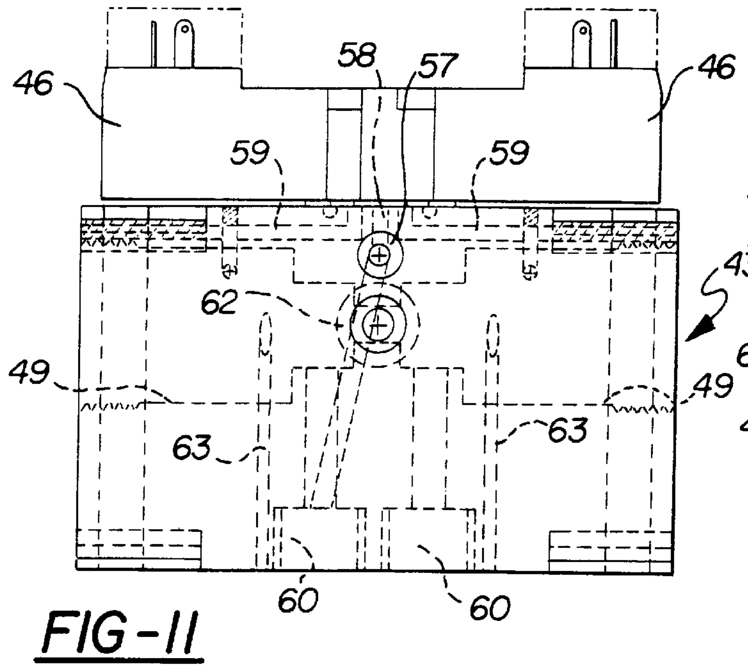
FIG. 11 is a side elevation view of the solvent/purge air end block shown in the FIG. 3.
Figure 12:
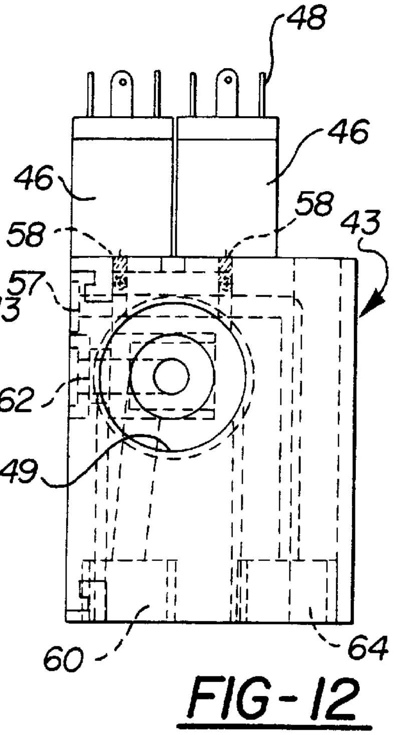
FIG. 12 is a front elevation view of the end block shown in the FIG. 11.
Figure 14:
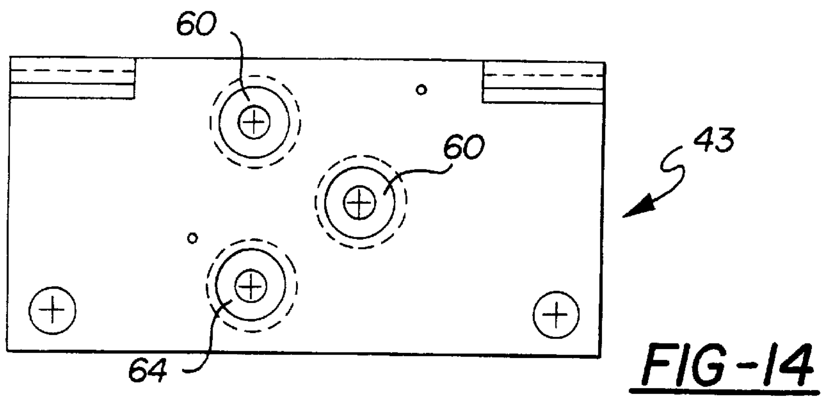
FIG. 14 is a bottom plan view of the end block shown in the FIG. 11.
Figure 17:
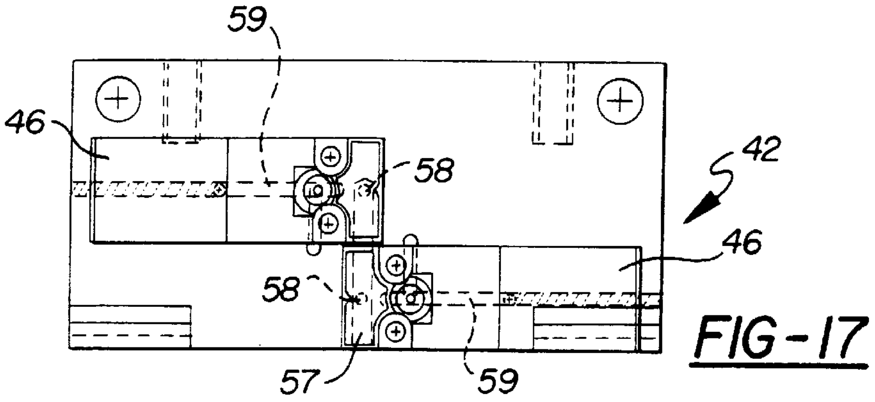
FIG. 17 is a top plan view of the end block shown in the FIG. 15.
Figure 15:
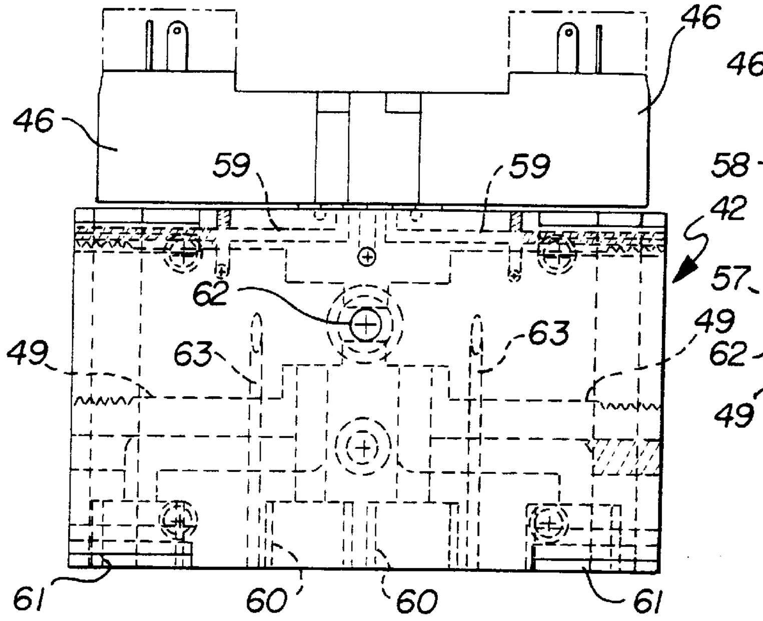
FIG. 15 is a side elevation view of the flow meter end block shown in the FIG. 3.
Figure 16:
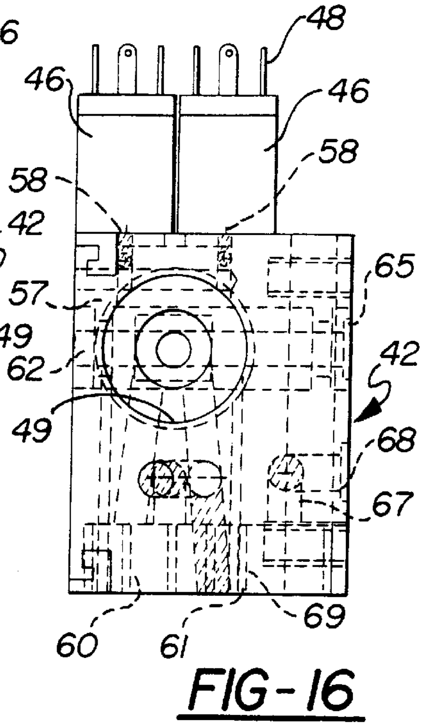
FIG. 16 is a front elevation view of the end block shown in the FIG. 15.
Figure 18:
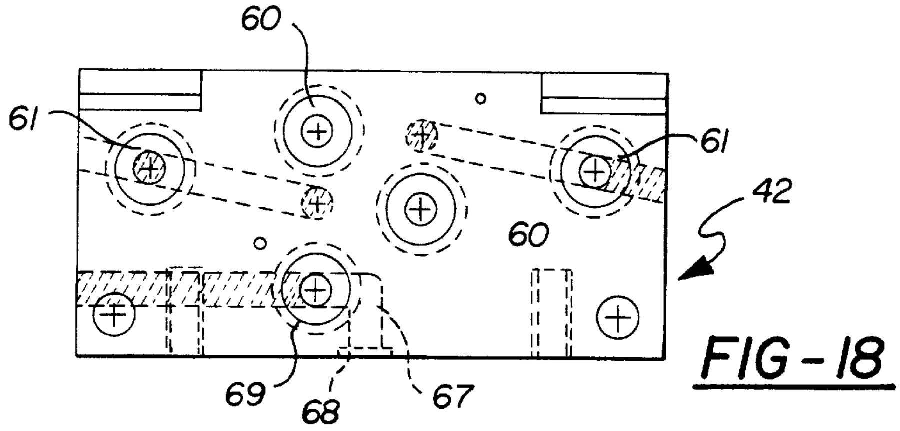
FIG. 18 is a bottom plan view of the end block shown in the FIG. 15.

As shown in the FIGS. 6, 7 and 9, each one of a pair of material inlet passages 60 extends from a bottom surface of the center block 44 to an associated one of the chambers 56. Similarly, each one of a pair of material outlet passages 61 extends from a bottom surface of the center block 44 to an associated one of the chambers 56. The passages 60 and 61 are connected to an associated one of the paint supplies 23 for continuously circulating a specific paint color in the chamber 56 and around the poppet 53. When the poppet 53 is unseated, the paint flows from the chamber 56 through the opening 55 and into a material distribution passage 62 which extends from side to side through the central block 44. The passage 62 is aligned with similar passages in the adjacent blocks. A pair of leak detection passages 63 extend from the bottom surface of the central block 44 to a location between the cylinder chamber 51 and the interior chamber 56 for detecting any leaks.

The solvent/purge air end block 43 is shown in greater detail in the FIGS. 11 through 14. The block 43 is similar in construction to the block 44 with a pair of the opposed valve cavities 49, the air supply passage 57, the upwardly extending branches 58, the connecting passages 59, a pair of the material inlet passages 60, the material distribution passage 62 and a pair of the leak detection passages 63. However, the air supply passage 57 extends from the side of the end block 43 abutting the adjacent center block 44 to an air inlet passage 64 which extends upwardly from the bottom surface of the block and can be connected to the air supply 25. The material distribution passage 62 extends from the side of the end block 43 abutting the adjacent center block 44 and is terminated inside the end block 43. One of the passages 60 can be connected to a source of solvent (not shown) and the other passage 60 can be connected to the air supply 25 to provide for cleaning the material distribution passages 62 before changing paint colors.

The flow meter end block 42 is shown in greater detail in the FIGS. 15 through 18. The block 42 is similar in construction to the block 44 with a pair of the opposed valve cavities 49, the air supply passage 57, the upwardly extending branches 58, the connecting passages 59, a pair of the material inlet passages 60, a pair of the material outlet passages 61, the material distribution passage 62 and a pair of the leak detection passages 63. However, the air supply passage 57 extends from the side of the end block 42 abutting the adjacent center block 44 and is terminated inside the end block. The material distribution passage 62 extends through the block 42 and terminates in a material outlet 65 which is connected to an inlet of a flow meter 66 (shown in the FIG. 2). A flow meter return passage 67 is formed in the block 42 with an inlet 68 positioned adjacent to the material outlet 65 for connection to an outlet of the flow meter 66. An outlet 69 of the passage 67 is positioned adjacent one of the material inlet passages 60 for connection to the paint applicator 24 (FIG. 2). Thus, during a spray painting operation, paint flows through the passage 62, out of the end block 42, through the flow meter 66, through the passage 67 and to the applicator 24.

Figure 19:
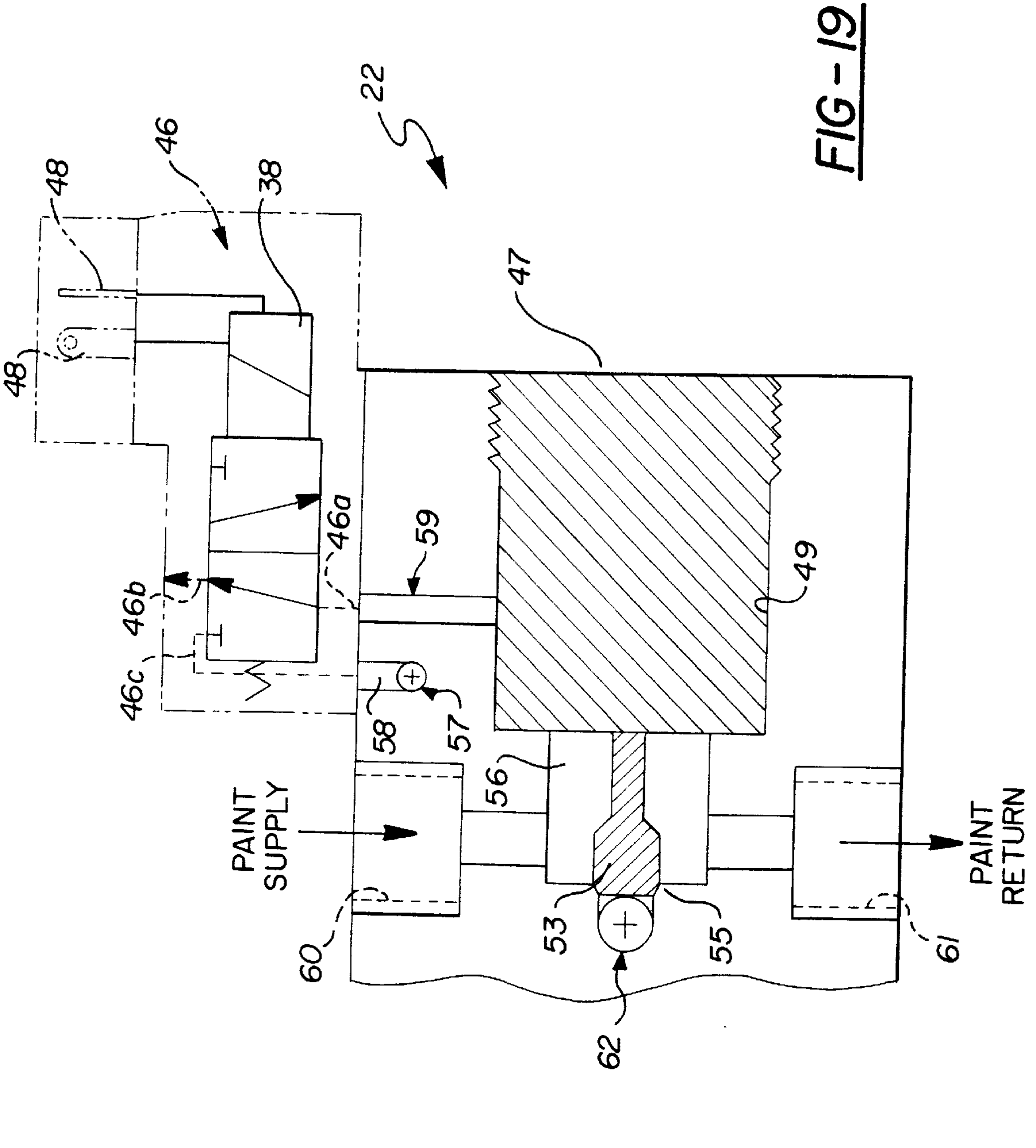
FIG. 19 is a detailed schematic diagram of the valves shown in the FIG. 3.

The connections between any associated pair of the valves 46 and 47 are shown in more detail in schematic form in the FIG. 19. The valve 46 has a first port 46*a* connected to the passage 59 in the valve 47, a second port 46*b* open to the atmosphere and a third port 46*c* connected to the branch 58. Prior to actuation of the valve 46, the ports 46*a* and 46*b* are connected together to exhaust air from the valve 47 to the atmosphere. During operation, electrical power is received at the terminals 48 which are connected to the solenoid coil 38 of the valve 46. The excitation of the solenoid coil 38 disconnects the first port 46*a* from the second port 46*b* and connects the first port to the third port 46*c* to transfer compressed air from the air distribution passage 57 and the branch 58 to the passage 58 to actuate the valve 47. The actuation of the valve 47 moves the poppet 53 away from the opening 55 and permits the flow of paint from the chamber 56 into the material distribution passage 62. Once, the desired amount of paint has been dispensed, as measured by the flow meter 66 (FIG. 2), the solenoid 38 is de-energized thereby disconnecting air supply an venting the passage 59 to the atmosphere and returning the spring biased poppet 53 to the closed position.

As discussed above, the design of the manifold assembly 41 is such that any one of the pneumatically actuated valves 47 can be removed and replaced without disturbing the associated solenoid actuated valve 46. During this removal operation, the paint supply 25 is turned off and the valve body 50 is unscrewed from the cavity 49. The associated solenoid actuated valve 46 is not disturbed since it is not attached to the valve 47. In addition, the compressed air supply 25 does not have to be disconnected because the valve 46 remains in the closed position blocking the flow of air to the cavity 49.

In summary, the paint spraying system 10 according to the present invention includes: the control circuit means 26 adapted to be located in the non-hazardous area 11 for generating the coded address signal representing a selected fluid material and for generating a predetermined amount of electrical power; the valve selection circuit means 27 connected to the control circuit means and having at least two outputs each corresponding to a different fluid material, the valve selection circuit adapted to be located in the non-hazardous area and being responsive to the coded address signal for generating the predetermined amount of electrical power at a selected one of the outputs corresponding to the coded address signal; and the valve actuation circuit means 28 including a separate valve means 46,47 connected to each of the valve selection circuit outputs, the valve actuation circuit means adapted to be located in the hazardous area 12 and each of the valve means having the material distribution passage 62 for connection to the common material applicator 24 and the material inlet passage 60 for connection to the separate supply of fluid material 23 whereby the control circuit means limits the predetermined amount of electrical power to a value sufficient to actuate one of the valve means and the valve means connected to the selected one output responds to the predetermined amount of electrical power by permitting flow of fluid material from the material inlet passage to the material distribution passage. The system 10 includes the manifold assembly 41 having a plurality of the blocks 44 each having at least one of the valve cavities 49 formed therein, the material distribution passage 62 formed in the block in fluid communication with the valve cavity, the material inlet passage 60 and the material outlet passage 61 formed in each block in fluid communication with the valve cavity, the air distribution passage 57 formed in the block and the connecting passage 59 formed in the block in fluid communication with the valve cavity; the separate electrically actuated valve 46 mounted on each block and connected between air distribution passage and the connecting passage; and the separate pneumatically actuated valve 47 associated with each of the electrically actuated valves and retained in an associated one of the valve cavities, whereby when the source of pressured air 25 is connected to the air distribution passage and the pneumatically actuated valves each are connected between the material applicator 24 and the supply of fluid material 23, actuation of a selected one of the electrically actuated valves applies the pressured air to the associated pneumatically actuated valve which is actuated to connect the supply of fluid material to the material applicator.

The method of selecting a fluid material to be supplied to a material applicator from a plurality fluid materials in a hazardous area includes the steps of: a. locating the plurality of pneumatically actuated valves 47 in the hazardous area 12 and connecting each of the pneumatically actuated valves between the associated source of fluid material 23 and the common material applicator 24; b. locating the plurality of electrically actuated valves 46 in the hazardous area and connecting each of the electrically actuated valves between the common source of pressured air 25 and an associated one of the pneumatically actuated valves; c. connecting each of the plurality of switches 17 between the common power supply 18 and an associated one of the electrically actuated valves; d. actuating one of the switches corresponding with a selected one of the fluid materials; and e. limiting electrical power from the power supply to the predetermined amount sufficient to actuate the electrically actuated valve connected to the one switch whereby the associated pneumatically actuated valve is actuated to permit flow of the selected fluid material to the material applicator.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for selecting a fluid material from a plurality of fluid materials to be supplied to a material applicator that is located in a hazardous area, the apparatus comprising:

a control circuit located in a non-hazardous area that is separated from the hazardous area that generates a coded address signal representing a selected fluid material and that generates a predetermined amount of electrical power;

a valve selection circuit coupled with said control circuit and having at least two outputs each corresponding to a different fluid material, said valve selection circuit being located in the non-hazardous area and supplying said predetermined amount of electrical power at a corresponding one of said outputs responsive to said coded address signal;

a valve assembly including a separate valve connected to each of said valve selection circuit outputs, said valve assembly being located in the hazardous area and each said valve including a material distribution passage in communication with the material applicator and a material inlet passage in communication with a separate supply of fluid material;

a power inhibitor coupled between said control circuit and said valve selection circuit to prevent inadvertent actuation of said valves; and wherein said control circuit limits said predetermined amount of electrical power to a value sufficient to actuate only one of said valves to permit flow of fluid material from said material inlet passage to said material distribution passage.

2. The apparatus according to claim 1 wherein said control circuit includes a power supply connected to an intrinsically safe barrier that limits said predetermined amount of electrical power to said valve.

3. The apparatus according to claim 2 wherein said barrier permits an additional amount of electrical power sufficient to operate said valve selection circuit to be supplied to said valve selection circuit.

4. The apparatus according to claim 1 wherein said control circuit includes a control that generates a control signal representing said selected fluid material and an address circuit that is responsive to said control signal and generates said coded address signal.

5. The apparatus according to claim 1 wherein said coded address signal is a five bit binary coded signal and said valve selection circuit includes a five to thirty-two decoder that is responsive to said coded address signal and generates an output signal on a selected one of thirty-two of said outputs.

6. The apparatus according to claim 1 wherein said valve selection circuit includes a decoder connected between a plurality of optical isolators and a plurality of switches, said optical isolators being connected to said control circuit and receiving said coded address signals and each of said switches being connected between said control circuit and an associated one of said valves for supplying said predetermined amount of electrical power to a selected one of said valves.

7. The apparatus according to claim 1 wherein each said valve includes a pneumatically actuated valve member connected between said material distribution passage and said material inlet passage, an air distribution passage in communication with a common source of pressured air, and an electrically actuated valve member connected between said air distribution passage and said pneumatically actuated valve member and connected to said valve selection circuit, said predetermined amount of electrical power actuating said electrically actuated valve member such that said pneumatically actuated valve member permits a flow of the selected fluid material from said material inlet passage to said material distribution passage.

8. The apparatus according to claim 7 wherein said valve assembly includes a block having at least one valve cavity formed therein for releasably retaining one of said pneumatically actuated valve members, said block having said material distribution passage, said material inlet passage and said air distribution passage formed therein, said electrically actuated valve member being mounted on said block and wherein said pneumatically actuated valve member can be removed from said valve cavity without moving said electrically actuated valve member.

9. The apparatus according to claim 8 including a plurality of said blocks attached together in side-by-side relationship to form a manifold assembly with said material distribution passages being aligned.

* * * * *